Patented Aug. 28, 1923.

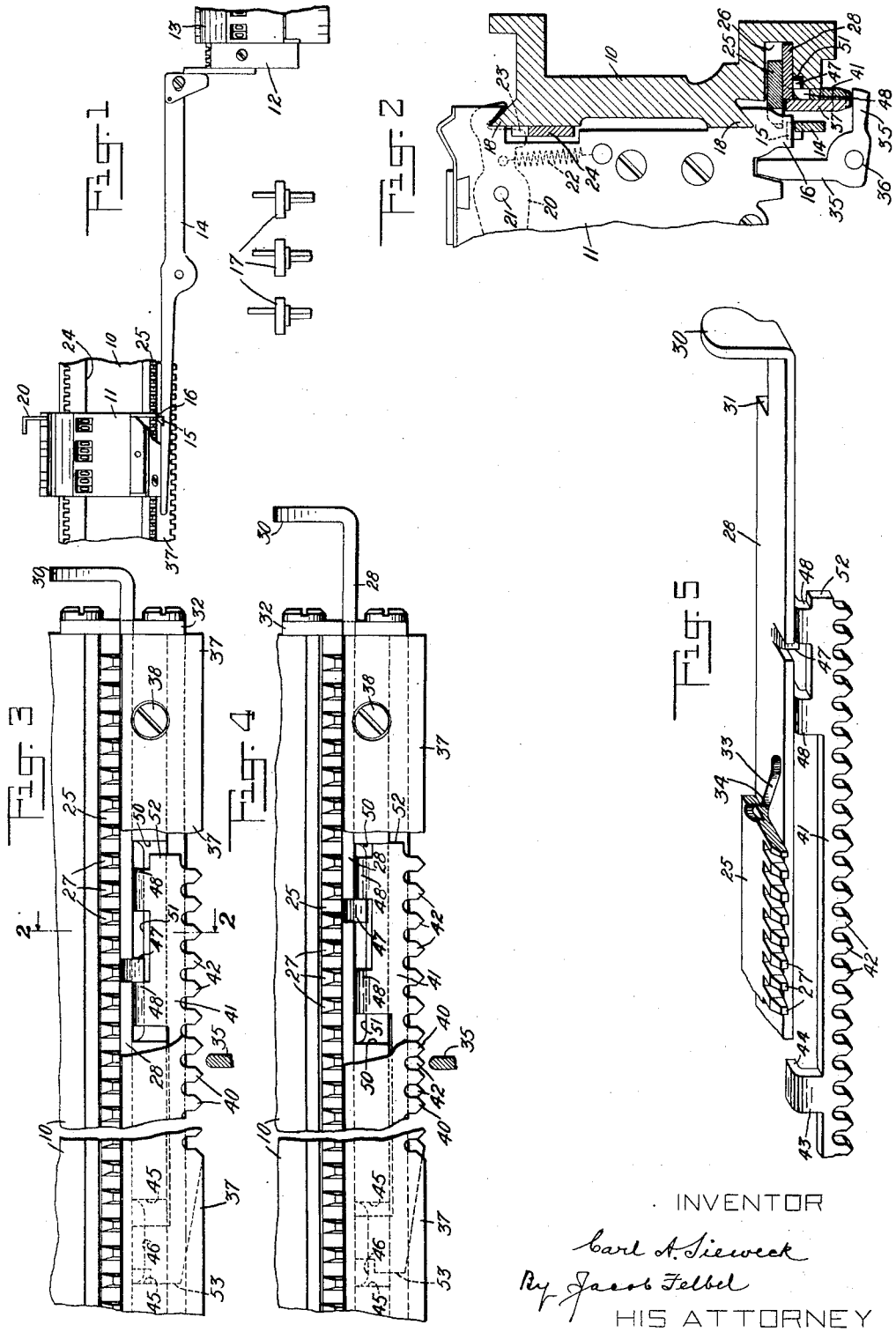

1,466,488

UNITED STATES PATENT OFFICE.

CARL A. SIEWECK, OF NEW YORK, N. Y., ASSIGNOR TO REMINGTON ACCOUNTING MACHINE CORPORATION, OF NEW YORK, N. Y., A CORPORATION OF NEW YORK.

CALCULATING MACHINE.

Application filed July 24, 1922. Serial No. 576,986.

*To all whom it may concern:*

Be it known that I, CARL A. SIEWECK, citizen of the United States, and resident of the borough of Manhattan, in the city of New York, in the county of New York and State of New York, have invented certain new and useful Improvements in Calculating Machines, of which the following is a specification.

My invention relates to calculating machines, and it has for its principal object to provide a certain locking device to insure correct operation of a calculating machine.

To the above and other ends, my invention consists in certain features of construction and combinations and arrangements of parts all of which will be fully set forth herein and particularly pointed out in the claims.

One instance of my invention is illustrated in the accompanying drawings in which, Figure 1 is a fragmentary more or less diagrammatic front view of a Remington accounting machine having my invention embodied therein.

Figure 2 is a front to rear section through the main truck of the machine together with fragments of cooperating parts.

Figure 3 is a front view, partly in section and partly broken away, of portions of said truck, the parts being shown in normal or working position.

Figure 4 is a similar view with parts shown in position for adjusting a totalizer on the truck.

Figure 5 is an isometric view showing some of the working parts in the relative positions they occupy as shown in Fig. 4 but with the truck structure removed to make said parts visible.

The Remington accounting machine, sometime called the Remington Wahl machine, to which for the purpose of illustration I have shown my invention applied, is shown and described in the patent to Wahl, 1,270,471, dated June 25, 1918, and said machine is also well-known commercially.

I have therefore deemed it unnecessary to illustrate it except fragmentarily. In the machine in said patent there is included a Remington typewriter combined with Wahl calculating mechanism, the latter including a main truck 10 on which are mounted any desired number of vertical totalizers 11, said truck being in the nature of a carriage traveling right and left, and suitably connected to the paper carriage of the typewriting machine. The Wahl mechanism also includes an auxiliary or cross truck 12 on which is mounted a cross totalizer 13. Said truck 12 has pivoted thereto and projecting leftward therefrom a so-called pick-up beam 14 having thereon a hook 15 which engages with lugs 16 one of which extends downward from the lower rear corner of the right-hand side plate of each of the vertical totalizers 11. Said vertical totalizers are operated, one wheel of one totalizer at a time, by a master wheel which in turn is operated by numeral keys 17, and the cross totalizer 13 is adapted to be picked up when one of the vertical totalizers 11 reaches a computing column and drawn along with said vertical totalizer past an auxiliary master wheel which operates said cross totalizer. At the end of the computing column beam 14 is cammed downward against the tension of a spring, releasing it from the vertical totalizer 11 and allowing the cross truck 12 to jump back to its right-hand normal position driven by a spring provided for the purpose. The cross truck effects one reciprocation, first moving to the left and then jumping back to the right, for every vertical totalizer that passes a computing zone in its travel toward the left. Where a machine is equipped with a number of vertical totalizers there is in the course of its operation a good deal of snapping or jumping back of across the cross totalizer, and sometimes when the carriage is moved to the extent of several computing columns leftward by hand there is a considerable strain on the lug 16 and hook 15 both by reason of said lug striking said hook in its leftward motion and also by reason of the fact that if two vertical totalizers are set close together and they are narrower than the full excursion of the cross truck 12 then when said cross truck jumps back it is arrested not by the fixed stop provided for the purpose but by the hook 15 striking the lug 16 of the next succeeding vertical totalizer. In another form of the Wahl machine shown in the patent to Wahl, 1,349,024, dated Aug. 10, 1920, the cross truck 12 is made longer and supports two cross totalizers and in that form of the machine the jarring is more objectionable even than in the first form mentioned because the cross truck is heavier. It has sometimes happened that a lug 16 has been broken off by the jarring referred to.

The vertical totalizers are mounted on the truck 10 by means of dove-tailed portions 18 on said truck co-operating with dove-tailed portions of the side plates of the totalizers, and each totalizer is held in place by means of a latch 20 pivoted thereto at 21 and drawn down by a spring 22 into engagement with the upper dove-tailed part 18 of the truck, and said hook has a tooth 23 adapted to engage between the teeth of a rack 24 secured to the front face of the truck near the upper edge thereof. The spring 22 holds the lower dove-tailed part of the totalizer snugly in engagement with the lower dove-tailed part 18 of the truck, but the latch 20, 23 for the totalizer is remote from the lug 16 which stands the strain and shock due to the engagement therewith of the hook 15.

In order to meet the situation above described, there has been provided an additional locking rack 25 seated in a groove 26 cut into the front face of the lower part of the truck 10, said rack and its connections forming the subject-matter of the application filed by R. G. C. Boa on June 22, 1921, Sr. No. 479,580. As more fully shown and described in said Boa application, the rack 25 has teeth 27 projecting from its forward edge and said rack can be slid bodily forward to the position shown in Fig. 2 where the lug 16 of each vertical totalizer will be engaged between two of the teeth 27 so that said lug will itself be directly held against right and left motion and directly supported so as to withstand the shocks and jars above referred to. Because the totalizers cannot be put on and off of the truck with the parts in the position shown in Fig. 2, nor adjusted lengthwise of said truck, said rack 25 is made so that it can be slid front and back to a sufficient extent to move the teeth 27 into and out of engagement with the lugs 16. Said rack lies on top of a shifting bar 28 also seated in the groove 26, and projecting at both ends beyond the truck 10 where it is bent up to form a push piece 30 by means of which said bar can be pushed right and left. Near each end of the bar 28 is cut away at the back to form a shoulder 31, and at each end of the truck there is secured thereto by screws a plate 32 having therein a slot just large enough to accommodate the reduced end of the bar 28. This plate prevents any endwise motion of the rack 25 but the shoulders 31 are so spaced as to permit a limited extent of endwise motion of the bar 28. Said bar 28 has, in it at least two and preferably more, cam slots 33, Fig. 5, into which slots round pins 34 project downward from the rack bar 25. Each of the slots 33 has its middle portion inclined as shown in Fig. 5, and its end portions parallel with the length of the truck. The construction is such that if the bar 28 be pushed toward the left to the position shown in Fig. 3 the rack bar 25 will be forced forward to the position shown in Fig. 2; whereas, if the bar 28 be pushed toward the right to the position shown in Figs. 4 and 5, the bar 25 will be moved toward the rear withdrawing its teeth 27 from engagement with the lugs 16 and permitting of adjustment of totalizers 11 along the truck. According to the Boa invention it is contemplated that the bar 25 be always in its working position shown in Fig. 2 except when it is desired to adjust a totalizer. In that event the bar 28 is pushed to the right, the totalizer is adjusted and then said bar 28 is pushed back to its normal left-hand position. In the said Boa application a detent is shown to hold said bar in either of its two positions.

It has been found that operators will sometimes release the totalizers from the rack 25 and adjust them and then neglect to restore said bar 25 to its working position with the result that all of the benefits of said rack bar are lost. It could easily happen that the bar 28 might be accidentally or inadvertently pushed to its right-hand position in some handling or manipulation of the machine, and thus the benefits of the Boa mechanism be lost.

In order to meet this situation I have provided means to prevent the operation of an essential part of the machine in case the Boa mechanism is left in its non-working position, thus to notify the operator of any error in this respect and to insure that the rack 25 is in its proper position before the machine is used. The Wahl mechanism includes as one of its essential parts a master dog 35 pivoted in the actuator at 36 and having a rearwardly directed arm which normally lies beneath a rack bar 37 secured to the front face of the truck by screws 38, and having downwardly directed pointed teeth 40. Whenever a numeral key 17 is depressed the master dog 35 is rocked in counter-clockwise direction, Fig. 2, and its horizontal arm moves upward between two of the teeth 40, thus positively locking the truck 10 in its correct position during the operation of the register wheels by the master wheel. The Wahl actuator contains a universal bar operated by all of the numeral keys and positively connected with the dog 35 so that in case said dog is locked against its usual rocking movement no numeral key can be depressed. I have therefore found this dog a convenient part to lock in case it is necessary to notify the operator that the rack bar 25 is not in working position. To this end I provide a locking rack 41 having teeth 42 similar to and adapted to register with the teeth 40 of the rack bar 37, said locking rack lying just behind the lower part of said rack bar 37 as shown in Fig. 2, and the main body of said rack bar lying beneath the lower edge of the truck 10, it being noted that the rack 37 projects some distance below said truck. In order to hold the locking bar in the described position said bar is provided with several ears 43 suitably spaced along its length and projecting upward from its upper edge, each of said ears at its upper end being bent to the rear to form a lip 44. The front face of the lower part of the truck 10 is at suitable intervals milled away as shown at 45 to make a slot, between the bottom of which and the rear surface of the bar 37 said ears 43 are guided; and at each of said intervals the bottom of the groove 26 is also milled away to form a notch or groove 46 in which the lip 44 rests in order to support the locking bar vertically. The slots or grooves in the truck are made somewhat more than long enough to allow for the bar 41 a longitudinal movement equal to one-half of a tooth space of the rack 37. Said locking bar is slid to the extent indicated in right and left-hand directions by means of a lug 47 struck down out of the stock of the shifting bar 28, said lug lying between two ears 48 near the right-hand end of the locking bar 41, each of these ears being bent toward the rear to form a lip similar to the lips 44. At a suitable point near the right-hand end of the truck said truck is milled away as shown at 50 to accommodate the ears 48 and also milled away as shown at 51 to accommodate the lips at the ends of said ears, this particular cutout being long enough to accommodate both of the ears 48 and to allow them their necessary motion. Said ears 48 are so spaced apart that the lost motion afforded between them for the lug 47 is about equal to the entire extent of motion of the shifting bar 28 less one-half tooth space of the rack 37. The construction is such that when said bar 28 is pushed to the left to its normal position shown in Fig. 3 the locking bar 41 will have its teeth 42 registering with the teeth 40 of the rack 37, but when the shifting bar is pushed to its non-working position the teeth 42 of the rack 41 will cover the interdental spaces of the rack 37 and one of said teeth will stand directly above the master dog 35 and block its operation and thus lock up the machine as shown in Fig. 4. In Figs. 3 and 4, a portion of the bar 37 is broken away to show a portion of the locking bar 41, and a portion of the master dog 35 is shown in section. It will be noted that when the parts are in the non-working position shown in Fig. 4 the keys of the machine are locked and that in order to unlock them it is necessary to push the shifting bar 28 through its entire excursion clear up to the left-hand limit of its movement because the first part of the motion of said shifting bar has no effect on the locking bar 41 due to the lost motion between the lug 47 and the left-hand ear 48. Each ear is not engaged and operated except by the last portion of the motion of the shifting bar. The machine is therefore effectually locked against operation except when the rack bar 25 is in its working position.

The right and left-hand motion of the locking bar 41 may be limited in any suitable way. As here shown the right-hand end of said bar is made into a lug 52 which when the locking bar reaches its extreme right-hand position is arrested by the shoulder constituting the right-hand end wall of the groove or cutout 50 in the truck. The left-hand end of said locking bar is also made into a lug 53 which, when the locking bar is in its extreme left-hand position, is arrested by the left-hand end wall of the left-hand cutout 45 in the truck.

Various changes may be made without departing from my invention.

What I claim as new and desire to secure by Letters Patent, is:—

1. In a calculating machine, the combination with a totalizer, a support for said totalizer, and releasable means for holding said totalizer to said support, of means associated with said holding means to lock an essential part of the machine in the event that said securing means is released.

2. In a calculating machine, the combination with a totalizer, a support for said totalizer, and a device carried by said support and movable into and out of position to hold said totalizer, of a lock associated with said holding device and movable in conjunction therewith so as to lock an essential part of the machine when said holding device is in releasing position and to unlock said part when said holding device is in working position.

3. In a calculating machine, the combination with a totalizer, a support for said totalizer, and a toothed bar carried by said support and movable into and out of position where its teeth engage and hold said totalizer, of a lock for an essential part of the machine associated with said toothed bar and movable in conjunction therewith into locking position when said toothed bar is moved to releasing position.

4. In a calculating machine, the combination with a support, a suitable number of totalizers mounted on and adjustable along said support, means for securing a totalizer in any position to which it is adjusted, and a master dog, of a locking rack engaged by said master dog and movable lengthwise in conjunction with the motion of said securing means so that when said securing means is in working position said master dog engages between two teeth of said locking rack, but when said securing means is in non-working position the teeth of said locking rack are in position to block the motion of said master dog.

5. In a calculating machine, the combination with a support, a suitable number of totalizers mounted on and adjustable along said support, a device movable to two positions in one of which it engages and holds the totalizer in its adjusted position and in the other of which it releases said totalizer for adjustment along said support, a toothed bar on said support, and a master dog for engagement with said toothed bar, of a toothed locking bar carried by said support and having its teeth normally registering with those of the first mentioned toothed bar, and means for shifting said locking bar in conjunction with the motion of said device to its releasing position to bring the teeth of said locking bar into register with the interdental spaces of the first mentioned bar in order to lock the master dog.

6. In a calculating machine, the combination with a totalizer support having a totalizer holding device 25 therein, and a shifting bar for moving said device into and out of holding position, of a locking bar having lost motion connection with said shifting bar whereby said locking bar is moved into and out of locking position by the last part of the motion of said shifting bar.

7. In a typewriting and calculating machine, the combination with a step-by-step moving carriage, a toothed bar traveling with said carriage, and a device on a stationary part of the machine adapted to move into and out of engagement with the teeth of said toothed bar, of a locking bar having teeth normally in register with the teeth of said traveling bar, and means for moving said locking bar so as to bring its teeth into register with the interdental spaces of said traveling bar thereby to lock said device.

8. In a typewriting and calculating machine, the combination with a carriage, a toothed bar mounted on and traveling with said carriage, keys, and a key operated part adapted to move into engagement with said toothed bar, of a locking bar carried by said carriage having teeth normally in register with the teeth of said toothed bar, a device on said carriage settable to different positions, and means operated by said device when set to a certain position to shift said locking bar to bring its teeth into register with the interdental spaces of said toothed bar in order to lock said key operated part and the keys.

9. In a calculating machine, the combination with a totalizer truck and a master dog, of a locking bar having ears working in grooves in said truck to allow said locking bar a limited motion endwise of said truck, a device carried by said truck and shiftable to different positions, and means whereby said device shifts said locking bar to one position where it does and to another position where it does not lock said master dog.

Signed at the borough of Manhattan, city of New York, in the county of New York, and State of New York, this 20th day of July, A. D. 1922.

CARL A. SIEWECK.

Witnesses:
 CHARLES E. SMITH,
 LILLIAN NELSON.